April 24, 1928.
A. J. LIPPOLD
1,667,075
MILK BOTTLE DRAINING DEVICE
Filed Jan. 25, 1923
3 Sheets-Sheet 2
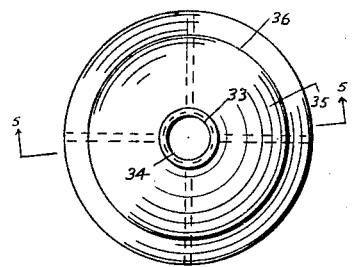
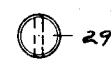
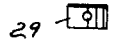
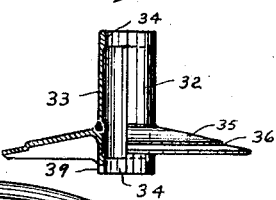
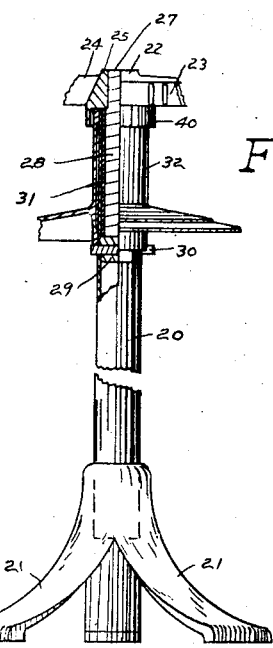
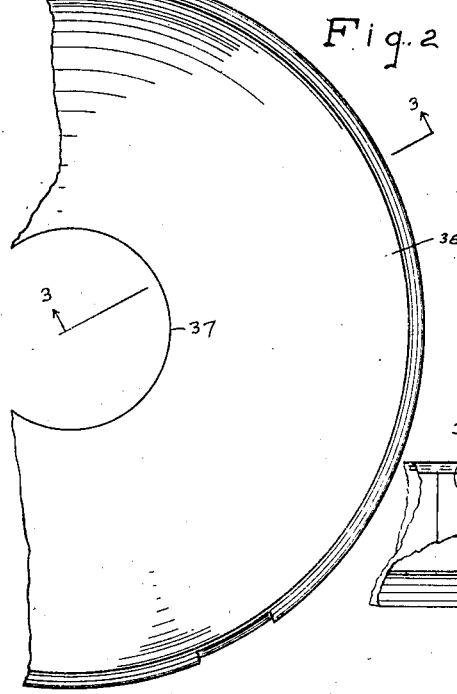
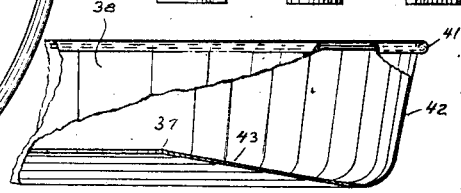
INVENTOR.
Adolph J. Lippold
BY Erwin Wheeler & Woolard
ATTORNEYS April 24, 1928.
A. J. LIPPOLD
1,667,075
MILK BOTTLE DRAINING DEVICE
Filed Jan. 25, 1923
3 Sheets-Sheet 3
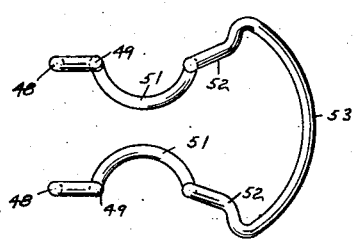
Fig. 9.
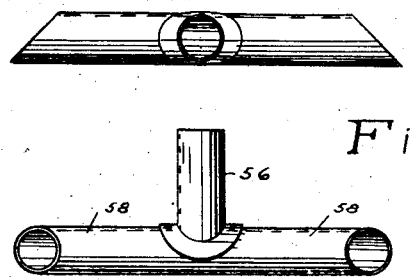
Fig. 13.
Fig. 14.
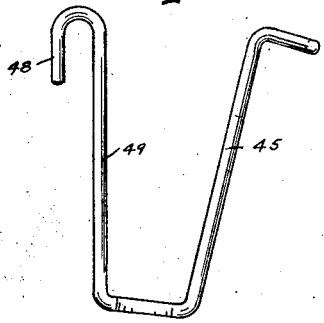
Fig. 10.
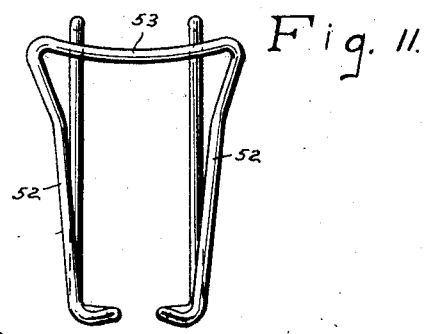
Fig. 11.
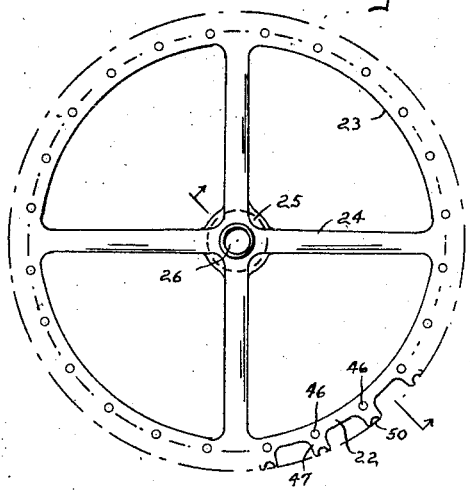
Fig. 12.
Fig. 15.
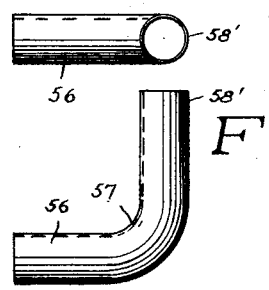
Fig. 16.
Fig. 17.
INVENTOR.
Adolph J. Lippold
BY
Erwin Wheeler & Woolard
ATTORNEYS Patented Apr. 24, 1928.

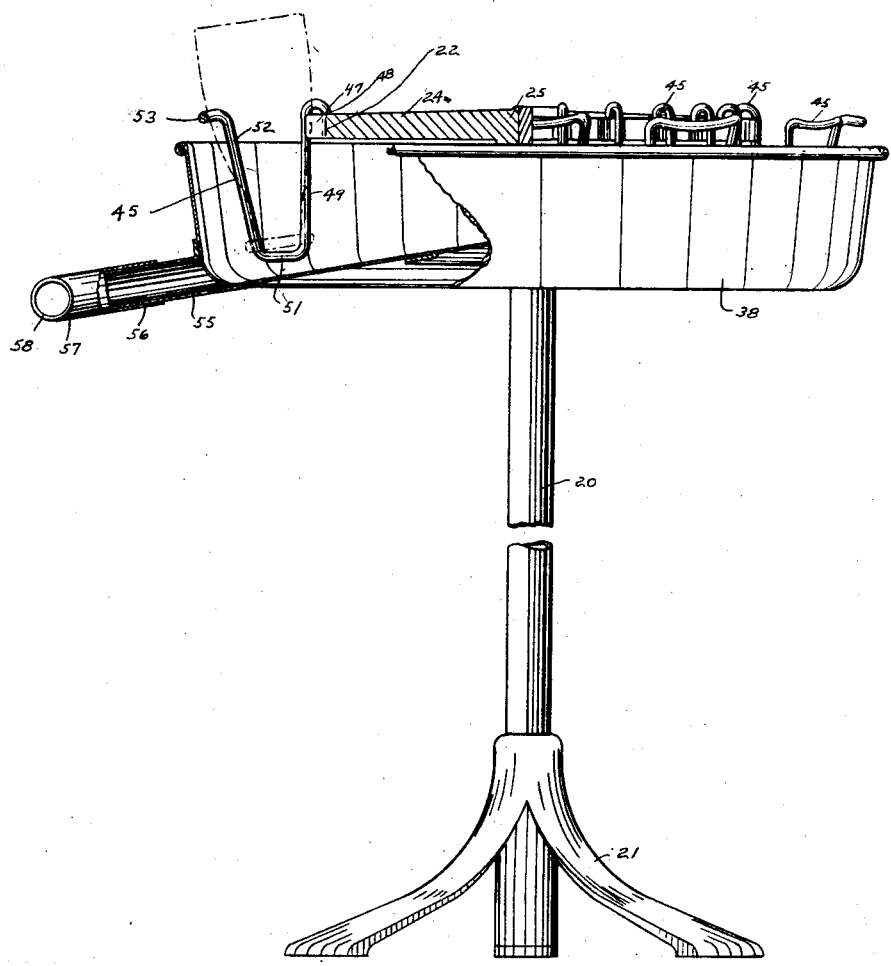

1,667,075

UNITED STATES PATENT OFFICE.

ADOLPH J. LIPPOLD, OF MILWAUKEE, WISCONSIN, ASSIGNOR TO MILWAUKEE DAIRY SUPPLY MFG. CO., OF MILWAUKEE, WISCONSIN.

MILK-BOTTLE-DRAINING DEVICE.

Application filed January 25, 1923. Serial No. 614,790.

This invention relates to improvements in milk bottle draining devices.

Dairies and like concerns dealing in bottled milk are confronted with the problem of emptying unsold milk from bottles returned by the drivers of milk delivery vehicles. The emptying of bottles hitherto has been accomplished merely by manually holding the bottles inverted for a period of time supposedly long enough to permit their contents to drain. When, however, the operators have been pressed for time the bottles have been insufficiently drained and the milk allowed to remain in them has been present in such quantities as to pollute the wash water. Thus the whole process has been expensive and inconvenient. The operator has had to maintain his grasp upon a pair of bottles for a length of time which, in the light of the present invention, seems to have been unnecessarily long and, in addition to the time involved, the draining has not been satisfactorily accomplished and pollution of the wash water has resulted as aforesaid.

It is the primary object of this invention therefore to provide a milk bottle drainer which will not only decrease the amount of work required of an operator, but will greatly increase the rapidity with which bottles may be handled and will insure that each bottle will be thoroughly drained. More particularly stated, it is the object of this invention to provide a rotary support adapted to hold bottles in an inverted position above a suitable receptacle, the number of bottles receivable by the support being such that no matter how rapidly the operator places full bottles in their positions upon the racks and removes empty ones therefrom, the empty ones will nevertheless have been afforded ample time for complete drainage.

There are many other objects for this invention, among which one of the foremost relates to suitable provisions for complete sanitation. As the disclosure of this device proceeds it will be apparent to those skilled in the art that the structure and arrangement of the parts hereof is intended and adapted to promote absolute cleanliness. Not only is each element simple and of such a nature as to avoid crevices and joints as far as possible, but also each element is preferably readily separable from each other element in order that cleansing of the entire machine may be expedited. Furthermore, provision is made for insuring that lubricant for the rotary parts hereof cannot find access to those parts through which a flow of milk takes place.

Still other objects of this invention include the provision of novel and simple means for supporting bottles in an inverted position, and the provision of a very simple two-way valve of a type which is extremely easy to clean and is particularly easy to control.

In the drawings:—

Fig. 1 is a side elevation of a device embodying this invention, portions of the milk receiving pan and bottle supporting spider being cut away to a central vertical section to expose the interior construction.

Fig. 2 is a plan view of a milk receiving pan.

Fig. 3 is a side elevation thereof, partially broken away to the section indicated by line 3—3 in Fig. 2.

Fig. 4 is a plan view of a pan supporting casting.

Fig. 5 is a side elevation thereof, partially cut away to a central vertical section.

Fig. 6 is a side elevation of a supporting pedestal, portions thereof being broken away to a central vertical section to expose the assembly of the pan supporting element and the element which carries the rotor.

Figs. 7 and 8 are, respectively, a plan and side elevation of a bearing element within the pedestal.

Fig. 9 is a plan view of a novel bottle supporting bracket.

Fig. 10 is a side elevation of the bracket.

Fig. 11 is a front elevation of the bracket.

Fig. 12 is a plan view of a special rotor adapted to support brackets, such as are shown in Figs. 9 to 11 inclusive.

Fig. 13 is a rear elevation of a very simple valve which I have found useful in this machine.

Fig. 14 is a plan view of the valve shown in Fig. 13.

Fig. 15 is a plan view of a modified valve construction, the valve being shown in its closed position.

Fig. 16 is a plan view of the same valve in an open position.

Fig. 17 is a detail taken on section indicated by lines 17—17 of Fig. 12.

Like parts are identified by the same reference characters throughout the several views.

This device is preferably assembled upon a pedestal which may comprise a column 20 terminating at its lower end in a three-legged casting 21. The column 20 may conveniently be made tubular as shown. A rotor 22 which, in its general appearance, resembles a sprocket wheel is adapted to receive bottle supporting brackets hereinafter to be described and is revolubly mounted upon column 20 in the following manner.

The rotor 22 includes a rim portion 23, spokes 24, and a hub 25. The hub is centrally apertured at 26 to receive the reduced end 27 of a stub shaft 28. This shaft finds a bearing upon a plug 29 which is positioned within the tubular column 20 by means of a transverse pin 30. A bushing sleeve 31 is preferably used between the stub shaft 28 and the upper portions of the tubular column 20. The plug 29, therefore, provides an end thrust bearing for stub shaft 28 and a radial bearing is found for said shaft in bushing 31.

The pin 30 has the additional function of supporting and securing against rotation a pan supporting casting designated in its entirety by the numeral 32 and shown in detail in Figs. 4, 5, and 6. Casting 32 preferably includes a sleeve-like member 33 having portions of reduced diameter 34 at its ends which are bored to receive tube 20 with a snug fit. This member also includes a frustro-conical and broadly flaring pan positioning device 35 which is shouldered at 36 to form an inner seat for the margin 37 of the pan 38. The pan will be described later.

The lower portion 34 of the pan supporting casting 32 is provided with a transverse slot 39 which, when the casting is properly adjusted, upon the tubular column 20, is adapted to register with and receive the extremities of pin 30. The arrangement is such that the casting 32 is not only supported from said pin, but is secured thereby against rotation about said column. The hub 25 of rotor 22 is preferably skirted at 40 to enclose the upper end of the tubular portion 33 of casting 32 and also the adjacent upper extremity of column 20. This construction not only prevents lubricant from escaping from the bearing within the column of stub shaft 28, but also prevents the ingress into said bearing of milk from pan 38. If the skirt 40 is not provided there is some danger that milk splashed about in said pan might find access to said bearing and might wash some of the oil therefrom.

The pan 38 to which reference has been made heretofore is preferably of one piece construction and may include a beaded margin 41, downwardly tapering sides 42, and an upwardly tapering bottom portion 43 terminating at 37 in a comparatively wide central opening adapted to register with and abut against the shoulder 36 of the pan supporting casting 32. Relatively high sides 42 are provided primarily for the purpose of catching milk which may splash about within the pan and it is not contemplated that the level of milk therein shall be higher than the central marginal portions 37 thereof.

The bottles to be emptied are supported from the rotor adjacent the sides 42 of pan 38 by means of a special type of bracket which will now be described.

Each bracket is designated in its entirety by the numeral 45. Rotor 22 is provided at intervals with apertures 46 from which the recessed lugs 47 project radially. Each bracket preferably comprises a single piece of wire bent to the form shown in Figs. 9, 10, and 11, the hook-shaped extremities 48 being shaped to register with and to be receivable into an adjacent pair of openings 46 of the rotor. When the hook-shaped extremities 48 of the bracket have been properly positioned in adjacent apertures 46 the adjacent substantially vertical portions 49 of the bracket will then register with the recesses 50 in lugs 47 upon the rotor. Thereby each bracket is positively secured to the rotor in such a way as to adapt it to support a bottle of milk upturned in a position such that its contents will readily drain from it.

The portions 51 of the bracket are concavely bowed toward each other in a substantially horizontal plane and serve to support the mouth of the bottle. These elements carry practically the entire weight of each bottle and of its contents until the milk has been fully drained. The bottle is inclined slightly outwardly, however, and is secured against outward tipping by means of the intermediate portion of the bracket including the upright rods 52 and the bowed member 53 which connects them and is curved to conform to the side of an ordinary bottle. Fig. 1 shows, in broken lines, a bottle positioned in one of the removable brackets which has just been described. It will be understood that the entire periphery of the rotor 22 is provided with brackets 45 as illustrated in Fig. 1. Each bracket is adapted to support a bottle in draining position and the milk drained from the several bottles so supported is collected by a pan 38.

The milk so collected finds an outlet from pan 38 through pipe 55 upon which the sleeve 56 of a distributing valve 57 has a close, sliding fit. This valve comprises either a T-shaped fitting such as is shown in Figs. 13 and 14, or an L-shaped fitting such as is shown in Figs. 15 and 16. In the former case, the tubular arms 58 of the T are open at their ends and obviously the milk will flow from that arm which is lowest. Thus two cans may be stationed side by side beneath valve 57 and the arms 58, together with sleeve 56 will be rotated slightly to incline said arms in the direction of one of the cans. When sufficient milk has flowed from the lower arm 58 to fill the can toward which said arm is inclined, the entire fitting will be rotated sufficiently to incline it oppositely in the direction of the other can, whereupon the milk will flow through the depressed arm into the unfilled can thereby permitting the filled can to be removed and another empty one to be substituted therefor. With this valve there is no possibility of shutting off the flow of milk as the valve merely serves to divert the flow alternately to either of two cans for the purpose of allowing one to be emptied while the other one is being filled.

The device shown in Figs. 15 and 16 comprises a modified valve having but a single arm which is designated by the character 58'. Whereas it is necessary in the use of the first described valve to rotate it but a few degrees to accomplish the diversion of milk from one can to another. The modified valve disclosed in Figs. 15 and 16 must be rotated at least 180° to obtain a like result. The arm 58' may be set at a slight inclination downwardly to one side or the other, and when it is desired to divert the flow to an unfilled can the arm will be rotated upwardly in each case so that the flow will be momentarily shut off and will be resumed only when the mouth of arm 58' has been turned sufficiently to bring it below the level of milk in pan 38.

This last described or L-shaped valve has the advantage, however, that when it is desired momentarily to cut off the flow of milk the single arm 58' may be left standing vertically and, when so positioned, will be at least as high as the margin of pan 38. This arrangement permits the use of a single can which, when it is full, may be removed by wholly cutting off the supply of milk in the manner above described. If the can is immediately emptied and restored to its position beneath the valve the milk level within the pan will not ordinarily rise above the inner margin 37 thereof.

The mode of operation of this entire device will now be described. With the parts assembled in the relation in which they clearly appear in Fig. 1 the operator will take from a case before him returned bottles of milk from which the caps have been removed. He will preferably grasp two bottles at a time and, inverting them over pan 38, he will position them within brackets 52. As these bottles fit within their respective brackets he will exert through them a slight pressure upon the rotor moving it about its axis for a sufficient distance so that two unoccupied brackets will be immediately before him. These will be filled with bottles in the manner above described and the rotor again advanced, the operation being repeated until all of the brackets are full. By this time the first bottles to be placed in the brackets have been allowed adequate time to drain into the stationary pan 38 about which they have been moving and the conveyor or carriage which comprises the rotor 22 will have restored the thoroughly drained bottles to their initial position before the operator. Thereafter the operator will with each downward movement restore two previously emptied bottles to the case and with each upward movement of his hands will replace upon the drainage racks upon the carrier two new bottles to be drained.

The advantages of this arrangement over the old time method in which the operator held each pair of bottles in his hands until they had drained will be obvious. In no case is the operator called upon to maintain his grasp upon the bottles longer than the time required to place them in the racks or to remove them from the racks. The very act of placing the bottles in the racks is sufficient to advance the carrier enough to bring a pair of drained bottles before the operator. The drained bottles are then removed and filled bottles substituted with a minimum amount of lost time. Nevertheless, each bottle is required to make the complete circuit of pan 38 upon the endless conveyor which is here shown in the form of rotor 22 and is thereby given adequate time to drain. The rotor may be made as large as desired, but it has been found that the twelve bottle type herein disclosed gives ample time for drainage and satisfies the objects specified for this invention.

I claim:

1. A bottle draining device including a pedestal having a tubular shaft, a plug within said shaft, a transverse pin extending through said plug and outwardly through said shaft, a rotor provided with a stub shaft rotatable within said tubular shaft in supported relation to said plug, a supporting casting exterior to said tubular shaft and notched to receive said transverse pin, an annular receptacle mounted upon said casting beneath said rotor, and means carried by said rotor for supporting bottles in an inverted position.

2. In a bottle draining device the combination with a rotor provided with spaced apertures about its periphery, of brackets each made integrally from a single piece of wire, the extremities of said wire being bent to comprise hooks receivable into said apertures.

3. A bottle draining device including a rotor having a hub portion, spokes radiating therefrom, and a periphery provided with spaced apertures, and recessed lugs projecting radially beyond each aperture in combination with bottle supporting brackets having upright portions terminating in hooks, said hooks being receivable in adjacent apertures, and said upright portions being receivable in corresponding recesses of said lugs.

4. In a device for use in emptying filled bottles, the combination with a rotatable bottle support including a wheel and brackets removably engaged with and supported by said wheel, of a receptacle having a drain adjacent its bottom, said brackets each including a portion in close proximity to the bottom of said receptacle and upon which the open end of a filled bottle may rest and a portion engageable with the sides of said bottle, the side of said receptacle extending vertically upward to a plane closely adjacent to said wheel, whereby the brackets are disposed substantially wholly within said receptacle.

5. In a bottle draining device, the combination with a support rotatable about a vertical axis, said support being provided with spaced apertures about its periphery, of a set of bottle supporting racks, said racks being provided with hook means adapted to disengageably engage in said apertures to secure said racks to said support in depending relation thereto.

ADOLPH J. LIPPOLD.